United States Patent
Bowen

(10) Patent No.: US 6,575,866 B2
(45) Date of Patent: Jun. 10, 2003

(54) HYBRID DRIVE SYSTEM FOR MOTOR VEHICLE WITH POWERSHIFT TRANSMISSION

(75) Inventor: Thomas C. Bowen, Rochester, MI (US)

(73) Assignee: New Venture Gear, Inc., Troy, MI (US)

(*) Notice: Subject to any disclaimer, the term of this patent is extended or adjusted under 35 U.S.C. 154(b) by 23 days.

(21) Appl. No.: 10/023,283

(22) Filed: Dec. 17, 2001

(65) Prior Publication Data

US 2002/0173401 A1 Nov. 21, 2002

Related U.S. Application Data

(60) Provisional application No. 60/282,573, filed on Apr. 9, 2001.

(51) Int. Cl.[7] .............................. F16H 3/72; F16H 3/62
(52) U.S. Cl. ............................ 475/5; 475/276; 475/277
(58) Field of Search .................... 477/3, 4, 5; 475/275, 475/277, 282, 283, 5, 8; 180/65.2

(56) References Cited

U.S. PATENT DOCUMENTS

| | | | |
|---|---|---|---|
| 3,468,192 A | | 9/1969 | Nasvytis |
| 4,200,006 A | | 4/1980 | Ehrlinger et al. |
| 4,211,313 A | | 7/1980 | Quick et al. |
| 4,423,794 A | | 1/1984 | Beck |
| 5,351,569 A | | 10/1994 | Trick et al. |
| 5,433,282 A | | 7/1995 | Moroto et al. |
| 5,495,906 A | | 3/1996 | Furutani |
| 5,558,175 A | * | 9/1996 | Sherman ................. 180/65.2 |
| 5,558,589 A | | 9/1996 | Schmidt |
| 5,669,842 A | | 9/1997 | Schmidt |
| 5,819,601 A | | 10/1998 | Kuhn |
| 5,833,570 A | * | 11/1998 | Tabata et al. .................. 477/3 |
| 5,856,709 A | | 1/1999 | Ibaraki et al. |
| 5,890,392 A | | 4/1999 | Ludanek et al. |
| 5,895,333 A | | 4/1999 | Morisawa et al. |
| 5,931,757 A | | 8/1999 | Schmidt |
| 5,943,911 A | | 8/1999 | Beckerman |
| 5,966,989 A | | 10/1999 | Reed, Jr. et al. |
| 6,011,066 A | | 1/2000 | Wang |
| 6,041,877 A | | 3/2000 | Yamada et al. |
| 6,053,833 A | | 4/2000 | Masaki |
| 6,083,135 A | * | 7/2000 | Baldwin et al. ........ 475/277 X |
| 6,083,138 A | | 7/2000 | Aoyama et al. |
| 6,083,139 A | | 7/2000 | Deguchi et al. |
| 6,090,005 A | | 7/2000 | Schmidt et al. |
| 6,098,733 A | | 8/2000 | Ibaraki et al. |
| 6,119,799 A | | 9/2000 | Morisawa et al. |
| 6,146,302 A | | 11/2000 | Kashiwase |
| 6,209,406 B1 | | 4/2001 | Sperber et al. |
| 6,209,407 B1 | | 4/2001 | Heinzel et al. |
| 6,244,368 B1 | | 6/2001 | Ando et al. |
| 6,371,882 B1 | * | 4/2002 | Casey et al. ................. 475/5 X |

* cited by examiner

*Primary Examiner*—Charles A. Marmor
*Assistant Examiner*—Roger Pang
(74) *Attorney, Agent, or Firm*—Harness, Dickey & Pierce P.L.C.

(57) ABSTRACT

A multi-speed transmission having an input shaft driven by the engine, an output shaft connected to the driveline, an electric motor, a planetary geartrain driven by one or both of the engine and the electric motor, a plurality of power-operated clutches operable for selectively engaging components of the planetary geartrain, and a control system for controlling automated operation of the power-operated clutches and coordinated actuation of the engine and the electric motor.

21 Claims, 9 Drawing Sheets

| SPEED | FIRST CLUTCH 114 | SECOND CLUTCH 116 | THIRD CLUTCH 118 | FOURTH CLUTCH 120 | FIFTH CLUTCH 122 | SIXTH CLUTCH 124 | SEVENTH CLUTCH 126 | EIGHTH CLUTCH 136 | NINTH CLUTCH 134 | RATIO |
|---|---|---|---|---|---|---|---|---|---|---|
| 1 | | | X | | | | X | X | | 4.1709 |
| 2 | X | | | | | X | X | X | X | 2.8729 |
| 3 | X | | X | X | | X | | X | | 1.5294 |
| 4 | X | | | | | X | | X | X | 1.0534 |
| 5 | X | X | | | X | | | | X | 0.6888 |

*Figure - 6*

HYBRID DRIVE SYSTEM FOR MOTOR VEHICLE WITH POWERSHIFT TRANSMISSION

CROSS-REFERENCE TO RELATED APPLICATIONS

This application claims the benefit of U.S. Provisional Application No. 60/282,573, filed Apr. 9, 2001.

FIELD OF THE INVENTION

The present invention relates generally to hybrid motor vehicles and, more particularly, to a hybrid automatic transmission adapted for installation in the drivetrain of a hybrid motor vehicle.

BACKGROUND OF THE INVENTION

Automobile manufacturers are constantly working to improve fuel efficiency. Improvements in fuel efficiency are typically directed to reduced weight, improved aerodynamics, and reduced power losses through the powertrain. However, the need to improve fuel efficiency is commonly offset by the need to provide enhanced comfort and convenience to the vehicle operator. As an example, manually-shifted transmissions are more fuel efficient than automatic transmissions due to lower parasitic losses. The higher losses associated with conventional automatic transmissions originate in the torque converter, the plate clutches and the hydraulic pump used to control the hydraulic shift system. However, a vast majority of domestic passenger vehicles are equipped with automatic transmissions due to the increased operator convenience they provide. Recent advances in power-operated shift systems have allowed development of "automated" versions of manual transmissions which automatically shift between sequential gear ratios without any input from the vehicle operator. Thus, automated manual transmissions provide the convenience of a traditional automatic transmission with the efficiency of a manual transmission.

Automobile manufacturers are also actively working to develop alternative powertrain systems in an effort to reduce the level of pollutants exhausted into the air by conventional powertrains equipped with internal combustion engines. Significant development efforts have been directed to electric and fuel-cell vehicles. Unfortunately, these alternative powertrain systems suffer from several disadvantages and, for all practical purposes, are still under development. However, several different "hybrid" electric vehicles have recently been offered for sale. These hybrid vehicles are equipped with an internal combustion engine and an electric motor that can be operated independently or in combination to provide motive power to the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilized a low-load mode where only the electric motor is used to drive the vehicle, a high-load mode where only the engine is used to drive the vehicle, and an intermediate assist mode where the engine and electric motor are both used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements. Thus, a need exists to develop hybrid powertrains for use in vehicles that utilize many conventional powertrain components so as to minimize specialized packaging and reduce cost.

SUMMARY OF THE INVENTION

It is therefore an object of the present invention to provide a parallel-type hybrid powertrain or drive system for a motor vehicle.

In accordance with this object, the hybrid drive system of the present invention includes a hybrid automatic transmission that can be installed in place of a conventional transmission between the engine and the driveline of the motor vehicle.

As a related object, the hybrid automatic transmission of the present invention includes a multi-speed gearbox, an automated shift system, and an electric motor. The electric motor is operably controlled to drive the multi-speed gearbox and to provide a speed synchronization function during gear shifting.

These and other objects are provided by a multi-speed transmission having an input shaft driven by the engine, an output shaft connected to the driveline, an electric motor, a planetary geartrain driven by one or both of the engine and the electric motor, a plurality of power-operated clutches operable for selectively engaging components of the planetary geartrain, and a control system for controlling automated operation of the power-operated clutches and coordinated actuation of the engine and the electric motor.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

BRIEF DESCRIPTION OF THE DRAWINGS

FIG. 6 is a chart listing the actuated status of various power-operated clutches for establishing the different speed ratios;

DETAILED DESCRIPTION OF THE PREFERRED EMBODIMENTS

The present invention is related to an integrated gearbox and electric motor assembly, hereinafter referred to as a hybrid automatic transmission, which is installed in a hybrid motor vehicle for delivering motive power (i.e., drive torque) to a pair of ground-engaging wheels. The compact arrangement of the electric motor and gearbox in a common housing permits the use of the hybrid automatic transmission in substitution for a conventional transmission. As such, a conventional powertrain can be used in combination with the hybrid automatic transmission to establish a hybrid drive system.

Figure 1:
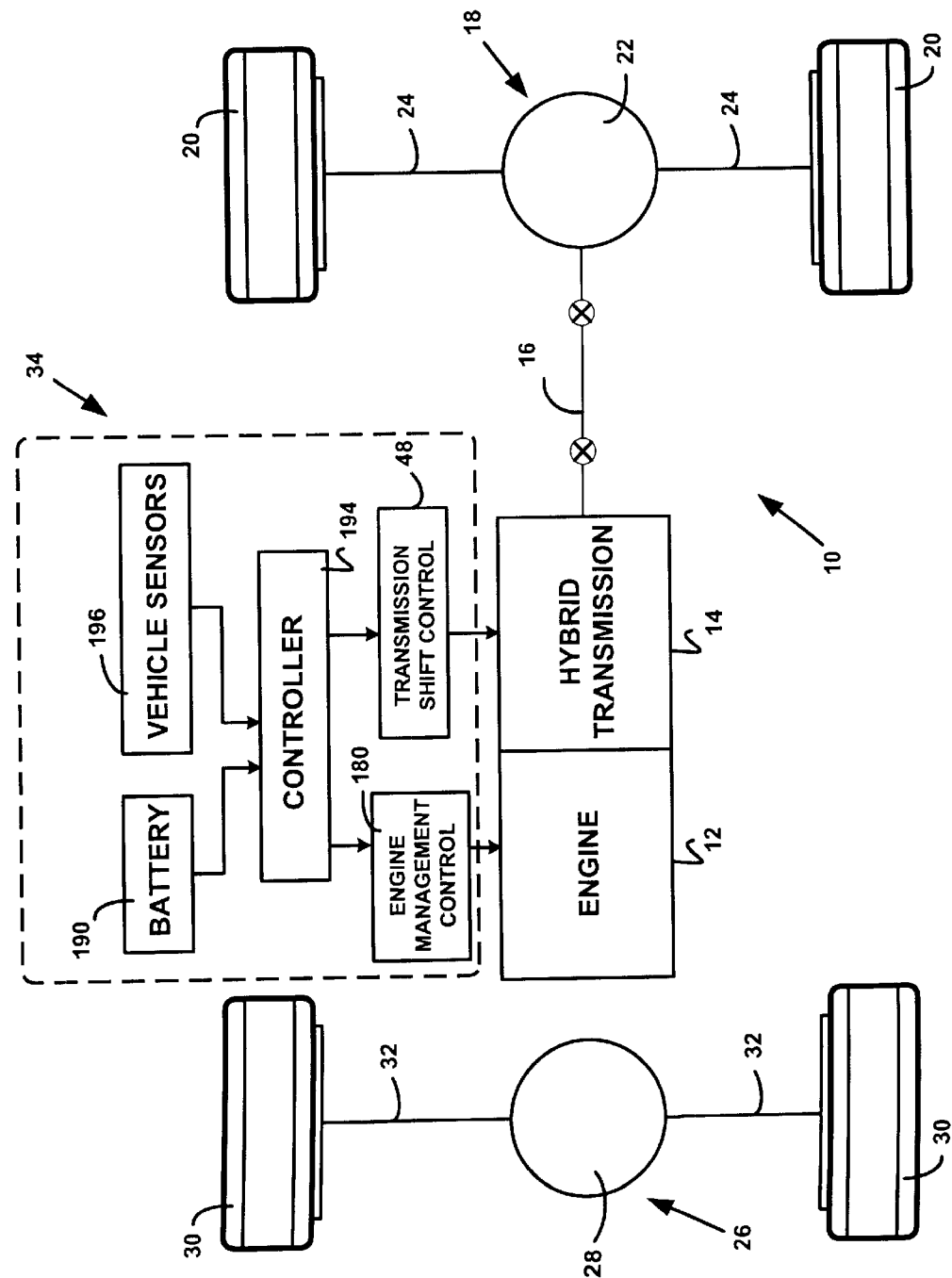
FIG. 1 is a schematic view of a powertrain for a hybrid motor vehicle.

Referring to FIG. 1, a powertrain for a hybrid electric vehicle 10 is shown to include an internal combustion engine 12, a hybrid automatic transmission 14, a drive shaft 16, and a primary axle assembly 18 connecting a first pair of wheels 20. Power from engine 12 and/or hybrid automatic transmission 14 is delivered by drive shaft 16 to a differential unit 22 associated with primary axle assembly 18 which is then transferred through a pair of axleshafts 24 to wheels 20. A secondary axle assembly 26 has a differential unit 28 interconnecting a second pair of wheels 30 via axleshafts 32. As will be detailed, an electronic hybrid powertrain control system 34 is used to control various systems associated with engine 12 and hybrid transmission 14 for smoothly transferring motive power to wheels 20.

With reference to FIGS. 2 through 7 of the accompanying drawings, the components and function of hybrid automatic transmission 14 will now be described in greater detail. Transmission 14 is connected to the output of internal combustion engine 12 and generally includes a flywheel damper unit 36, an input brake 38, and input shaft 40, an output shaft 42, a planetary geartrain 44, an electric motor/generator 46, and a transmission shift control system 48.

The rotary power generated by engine 12 is delivered to a flywheel 50 of damper unit 36 through a drive plate 52 to input shaft 40. Geartrain 44 includes a first planetary gearset 54, a second planetary gearset 56, a third planetary gearset 58, a mainshaft 60, and a layshaft assembly 62. First planetary gearset 54 includes a first sun gear 64, a first ring gear 66, and a set of first planet gears 68 meshed with first sun gear 64 and first ring gear 66. First planet gears 68 are rotatably supported from a first planet carrier 70 which is fixed for rotation with input shaft 40. First sun gear 64 is shown to be fixed to a first transfer shaft 72 which is rotatably supported on input shaft 40. Second planetary gearset 56 includes a second sun gear 74, a second rig gear 76 fixed for common rotation with first ring gear 66, and a set of second planet gears 78 meshed with second sun gear 74 and second ring gear 76. Second planet gears 78 are rotatably supported by second planet carrier 80 which is fixed for common rotation with mainshaft 60. Second sun gear 74 is fixed for rotation with a second transfer shaft 82 which is rotatably supported on mainshaft 60. Third planetary gearset 58 includes a third sun gear 84 fixed for rotation with mainshaft 60, a third ring gear 86, and a set of third planet gears 88 meshed with third sun gear 84 and third ring gear 86. Third planet gears 88 are rotatably supported by a third planet carrier 90 which is fixed for rotation with output shaft 42.

Layshaft assembly 62 includes a layshaft 92, a headset 94, a first constant-mesh gearset 96, and a second constant-mesh gearset 98. Headset 94 includes a drive gear 100 fixed to a rotor 102 of electric motor 46 and which is meshed with a driven gear 104 fixed to layshaft 92. First constant-mesh gearset 96 includes a first speed gear 106 rotatably supported on layshaft 92 and which is meshed with a first drive gear 108 fixed to second transfer shaft 82. Second constant-mesh gearset 98 includes a second speed gear 110 rotatably supported on layshaft 92 and which is meshed with a second drive gear 112 fixed to third ring gear 86.

Shift control system 48 includes a plurality of power-operated clutches. These clutches are dual-mode controllable overrunning clutches. The term "controllable" is used to define the dual mode function of each clutch wherein operation in a "locked" mode results in a bi-directional clutching action and operation in a "released" mode permits freewheeling in both directions. In particular, a first clutch 114 is operable for selectively coupling third planet carrier 90 to third sun gear 84. Thus, with first clutch 114 in its locked mode, third planetary gearset 58 is locked and mainshaft 60 drives output shaft 42 at a common speed. A second clutch 116 is operable for selectively coupling second transfer shaft 82 to second planet carrier 80. As such, with second clutch 116 in its locked mode, second planet carrier 80 is coupled to second sun gear 74 such that second planetary gearset 56 is locked and second ring gear 76 drives mainshaft 60 at a common speed.

Shift control system 48 further includes a third clutch 118 operable for selectively coupling first transfer shaft 72 to first planet carrier 70 such that first sun gear 64 is coupled for common rotation with first planet carrier 70. Thus, with third clutch 118 in its locked mode, first planetary gearset 54 is locked and first ring gear 66 is driven at a common speed with input shaft 40. A fourth clutch 120 is operable for selectively coupling a second speed gear 110 to layshaft 92. A fifth clutch 122 is operable for selectively coupling first speed gear 106 to layshaft 92. A sixth clutch 124 is operable for selectively coupling drive gear 100 to first transfer shaft 72 such that rotor 102 is coupled to first sun gear 64. A seventh clutch 126 is operable to selectively couple second speed gear 110 to a stationary member 128. Thus, seventh clutch 126 acts as a brake when locked to prevent rotation of second gearset 98 and third ring gear 86. An eighth clutch 130 is operable for selectively coupling second transfer shaft 82 to a stationary member 132. Thus, eighth clutch 130 acts as a brake when locked to prevent rotation of second sun gear 74. A ninth clutch 134 is operable for selectively coupling first transfer shaft 72 to a stationary member 136. Thus, ninth clutch 134 also acts as a brake when locked to prevent rotation of first sun gear 64.

Figure 4:
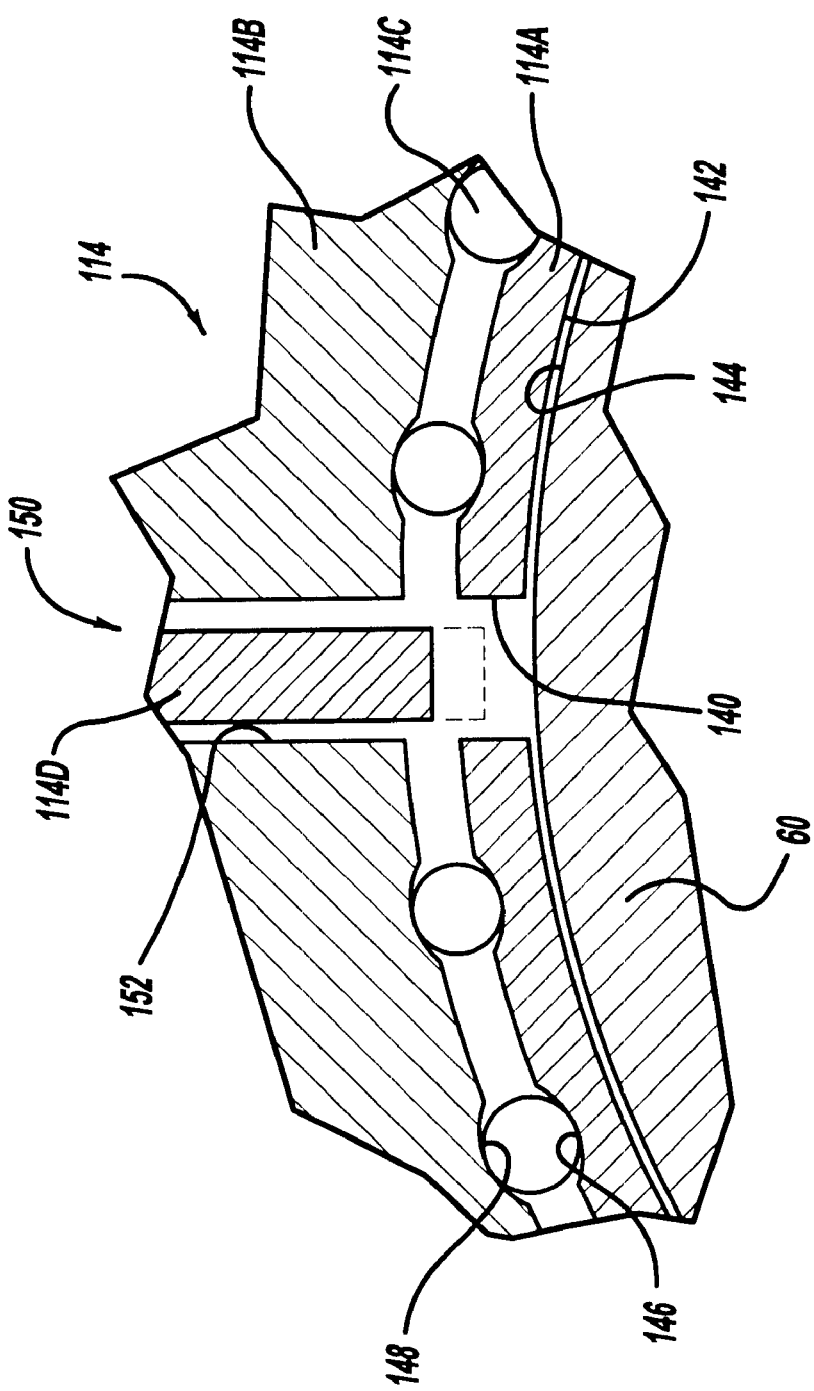
FIG. 4 is a partial sectional view of one of the controllable power-operated clutches associated with the hybrid automatic transmission shown in FIG. 2.

Referring to FIG. 4, the components of first controllable overrunning clutch 114 are shown in detail with the understanding that the second through ninth controllable overrunning clutches have similar structure and function. First overrunning clutch 114 is shown to include an inner ring 114A, and outer ring 114B, and a plurality of locking elements 114C disposed therebetween. Inner ring 114A is a C-shaped split ring which defines a slot 140. Inner ring 114A has an inner cylindrical surface 142 which is supported on an outer cylindrical surface 144 of mainshaft 60. Outer ring 114B is fixed for common rotation with third planet carrier 90. A series of complementary arcuate locking surfaces 146 and 148 are respectively formed in the outer cylindrical surface of inner ring 114A and the inner cylindrical surface of outer ring 114B and which are alignable to define roller pockets. Preferably, locking elements 114C are rollers that are disposed in the roller pockets.

First overrunning clutch 114 also includes a mode shift mechanism 150 which can be selectively actuated to shift first clutch 114 between its locked and released modes. With first clutch 114 in its locked mode, it acts to prevent relative rotation between third sun gear 84 and third planet carrier 90 in either direction, thereby coupling mainshaft 60 for common rotation with output shaft 42. In contrast, first clutch 114 functions in its released mode to permit bi-directional relative rotation between mainshaft 60 and output shaft 42. Mode shift mechanism 150 basically functions to control relative movement between inner ring 114A and outer ring 114B. In the embodiment shown, mode shift mechanism 150 includes a pin 114D extending through a radial aperture 152 formed in outer ring 114B and a spring 114E located between outer ring 114B and a head segment of pin 114D. Spring 114E functions to normally bias pin 114D in a radially outward direction to a first position (shown by solid line in FIG. 4) whereat the terminal end of pin 114D is disengaged from slot 140 in inner ring 114A. With pin 114D in its first position, first bi-directional overrunning clutch 114 functions in its locked mode. That is, rotation of inner ring 114A relative to outer ring 114B in either direction causes rollers 114C to ride up and engage opposed locking surfaces 146 and 148, frictionally clamping inner ring 114A to mainshaft 60. The ability of inner ring 114A to index circumferencially in either direction relative to outer ring 114B causes locking engagement regardless of the direction of relative rotation to accommodate both drive and cost conditions.

When it is desired to shift first overrunning clutch 114 from its locked mode into its released mode, pin 114D is moved in an inward direction from its first position to a second position, in opposition to the biasing of spring 114E. With pin 114D in its second position, its terminal end is positioned within slot 140 of inner ring 114D so as to locate and maintain inner ring 114A in a centered position relative to outer ring 114B. As such, inner ring 114A is prevented from indexing relative to outer ring 114B in either direction such that rollers 114C are centered in the roller pockets. With rollers 114C centered in the roller pockets, inner ring 114A is released from clamped engagement with mainshaft 60 so as to permit bi-directional relative rotation between third sun gear 84 and third planet carrier 90. Accordingly, overrunning clutch 114 is operable in its released mode to permit freewheeling in both directions.

Figure 5:
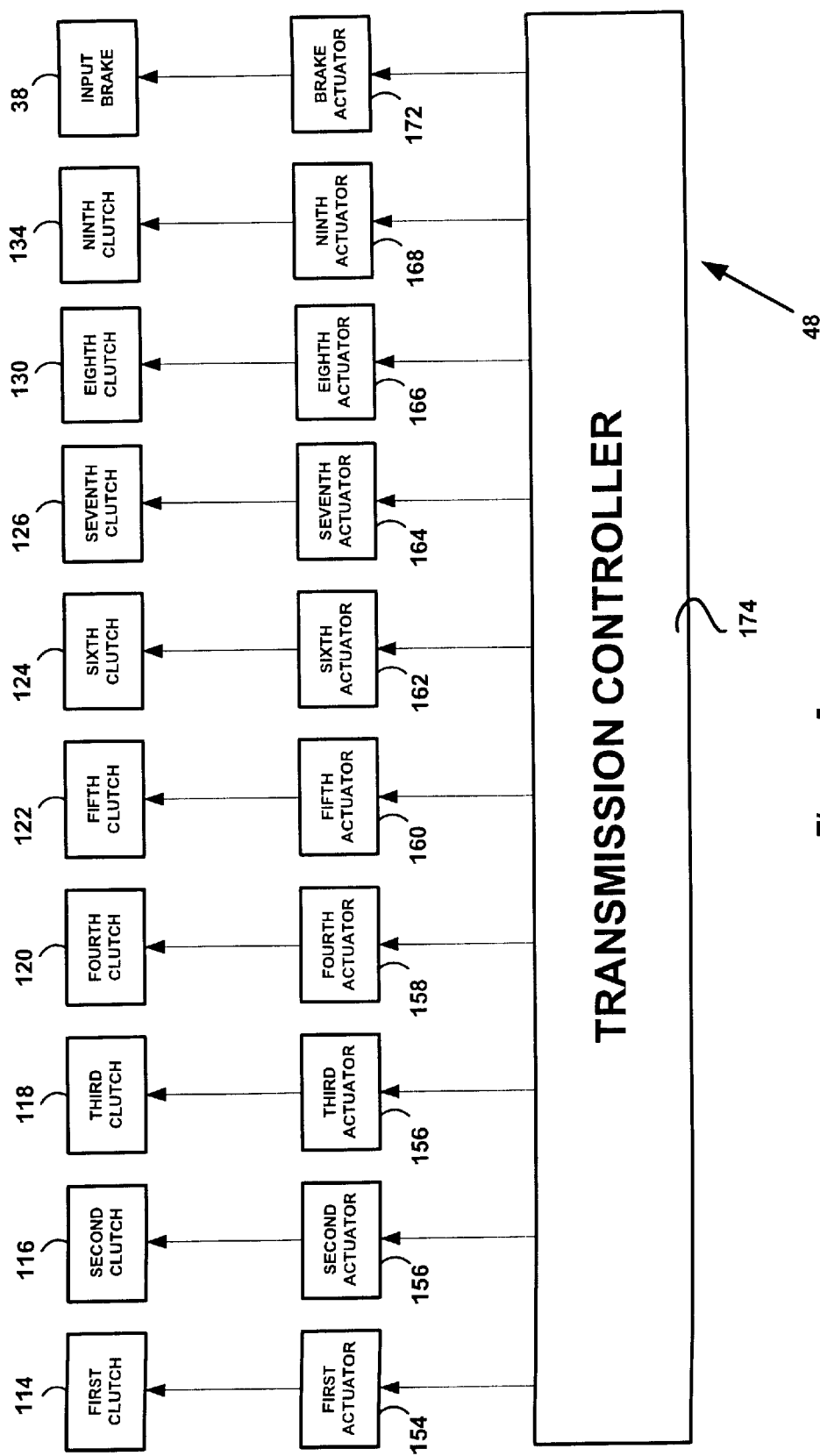
FIG. 5 is a diagram of the transmission shift control system associated with the hybrid transmission of the present invention.

To provide a means for moving pin 114D between its first and second positions for shifting first overrunning clutch 114 between its locked and released modes, shift control system 48 includes a power-operated clutch actuator 154. Clutch actuator 154 is an electrically-activated device operable for moving pin 114D in response to an electric control signal. Preferably, clutch actuator 154 functions in a power-off condition to hold pin 114D in its second position and is shifted into a power on condition in response to the electric control signal for permitting spring 114E to forcibly urge pin 114D to its first position. To this end, clutch actuator 154 can be any suitable two-position device, such as an electromagnetic solenoid operator. As will be understood, the remaining second through ninth controllable overrunning clutches are substantially identical in structure and function to that described for first overrunning clutch 114. Thus, common suffixes are used with corresponding reference numerals to identify similar components. Moreover, power-operated clutch actuators are schematically shown in FIG. 5 for the eight other overrunning clutches and are designated by corresponding reference numerals 156 through 170. Power-operated clutch actuators 156 through 170 are substantially similar in function to that of clutch actuator 154. In addition, a power-operated brake actuator 172 is shown to control actuation of input brake 38. With input brake 38 in its locked mode, input drum 50 and input shaft 40 are held against rotation. In its released mode, power from engine 12 is transferred to input shaft 40. Brake actuator 172 is preferably a variable control device capable of progressively shifting input brake 38 between its locked and released modes. Control system 48 further includes a transmission controller 174 which functions to control coordinated actuation of the clutch actuators, brake actuator 172 and electric motor 46.

Referring to FIG. 6, a chart of the different forward speed ratios and the corresponding clutch actuator conditions is shown. Specifically, an "X" indicates that the corresponding clutch is in a locked mode. Exemplary numerical speed ratios are provided to illustrate the similarity to commercially-accepted conventional automatic transmission. These ratios are established by the gear components of geartrain 44 having the following number of gear teeth:

| Component | No. of Teeth |
|---|---|
| First sun gear 64 | 28 |
| First ring gear 66 | 62 |
| First planet gears 68 | 17 |
| Second sun gear 74 | 36 |
| Second ring gear 76 | 68 |
| Second planet gears 78 | 16 |
| Third sun gear 84 | 44 |
| Third ring gear 86 | 76 |
| Third planet gears 88 | 16 |

Obviously, the speed ratios can be modified to fit the requirements of each particular vehicular application. As will be detailed, electric motor 46 is used to synchronize the rotary speed of the various components of geartrain 44 prior to locking of the clutches. Thus, motor 46 serves two distinct functions, namely, (1) to act as a power source for delivering electrically-generated motive power through transmission 14 to wheels 20, and (2) to react with engine torque for speed synchronization during gearshifts.

To establish the first gear ratio, third clutch 118 is locked to lock first planetary gearset 54, seventh clutch 126 is locked to brake rotation of third ring gear 86, and eighth clutch 130 is locked to brake rotation of second sun gear 74. This causes output shaft 42 to be driven at the first speed ratio relative to driven rotation of input shaft 40. When transmission 14 is shifted from first gear into second gear, third clutch 118 is released and sixth clutch 124 is locked for coupling rotor 102 to first transfer shaft 72. Thereafter, motor 46 is controllably actuated to react against power delivered to input shaft 40 by engine 12, thereby causing the speed of first sun gear 64 and input shaft 40 to slow relative to output shaft 42. When the rotary speed of first sun gear 64 reaches zero, ninth clutch 134 is locked to hold first sun gear 64 against rotation and establish the second gear ratio.

When transmission 14 is shifted from second gear into third gear, seventh clutch 126 is released, ninth clutch 134 is released, eighth clutch 130 is maintained in its locked condition, fourth clutch 120 is locked to couple second constant-mesh gearset 98 to layshaft 92, and third clutch 118 is locked for driving first planetary gearset 54 at a direct speed ratio. Since sixth clutch 124 is locked, motor torque drives first planetary gearset 54 through transfer shaft 72 and third planetary gearset 58 through layshaft 92 and second constant-mesh gearset 98. Once the rotary speed of third sun gear 84 matches that of third carrier 90, first clutch 114 is locked to establish the third speed ratio.

When transmission 14 is shifted from third gear to fourth gear, first clutch 114 is maintained in its locked mode, eighth clutch 130 is maintained in its locked mode, and third clutch 118 and fourth clutch 120 are both released. Thereafter, motor torque is applied to first sun gear 64 through sixth clutch 124 to react against engine power delivered to input shaft 40 and slow the rotary speed of first sun gear 64 to zero. Once the second of first sun gear 64 is zero, ninth clutch 134 is locked to brake first sun gear 64 and establish the fourth ratio drive connection. The fifth gear ratio is established by maintaining first clutch 114 and ninth clutch 134 in their locked modes, releasing eighth clutch 130 to permit rotation of second sun gear 74, releasing sixth clutch 124 and locking fifth clutch 122 such that motor torque is delivered through layshaft 92 and first constant-mesh gearset 96 to drive second sun gear 74. Once the speed of second sun gear 74 matches that of second planet carrier 80, second clutch 116 is applied for establishing the fifth ratio drive connection.

In each speed change, the motor torque reacts against the engine to establish a synchronous speed at which point the gear change is completed. Since the motor torque reacts against engine torque, transmission 14 continues to transmit positive torque to output shaft 42 during shifts, thereby resulting in a true powershift. The rate of speed change may be controlled by controlling the relationship between motor torque and engine torque during shifts. Transmission 14 also downshifts under power, since the torque reactions are reversed (i.e., the motor torque accelerates the engine during downshifts). An engine management control system 180 that reduce torque during upshifts and reduce torque during downshifts is used in conjunction with transmission shift control system 48 to assist electric motor 46 in providing smooth powershifts.

Figure 2:
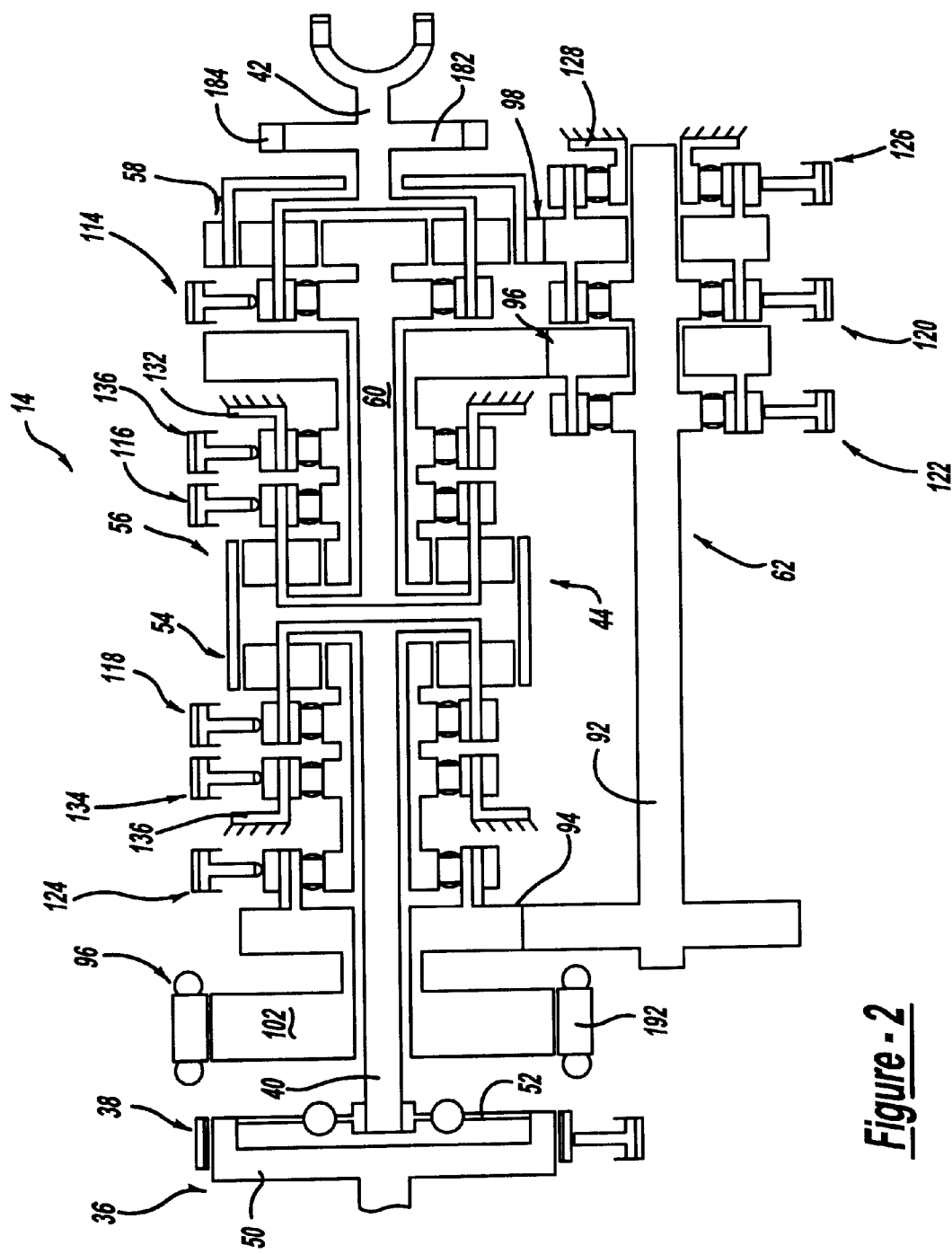
FIG. 2 is a schematic view of a multi-speed hybrid automatic transmission adapted for use in the hybrid motor vehicle shown in FIG. 1.
Figure 3A:
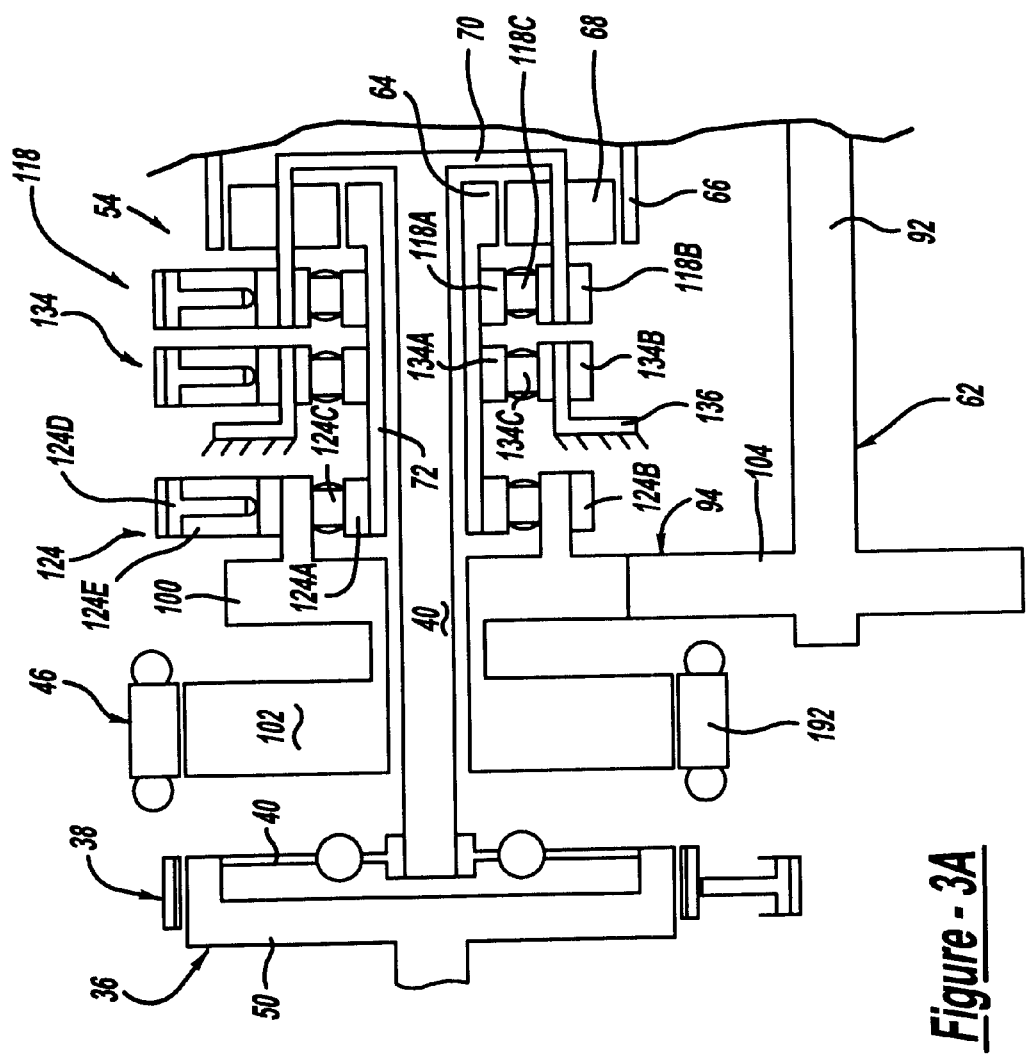
FIGS. 3A and 3B are enlarged partial sectional views of FIG. 2 showing the components of the hybrid automatic transmission in greater detail.
Figure 3B:
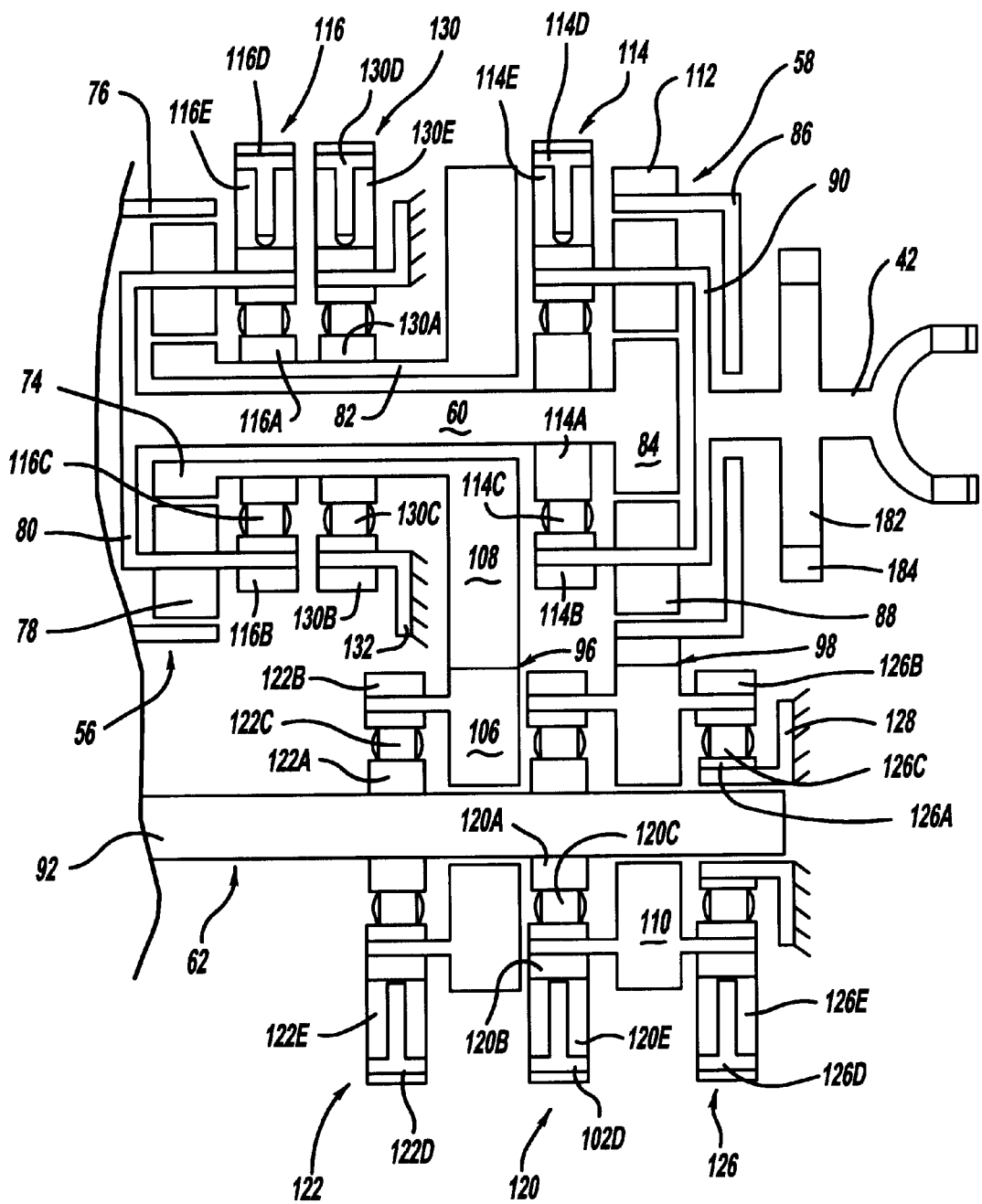

Geartrain 44 is shown in FIGS. 2 and 3B to further include a parking pawl wheel 182 that is fixed to output shaft 42 and a parking pawl 184 that is operable to engage wheel 182 for releasably locking output shaft 42 to a stationary member (i.e., the housing of transmission 14) to prevent rotation of output shaft 42. Parking pawl 184 is operable to release output shaft 42 when the gearshift lever is returned to its PARK position.

The hybrid powertrain system of the present invention includes two drive power sources, namely, engine 12 and electric motor assembly 46 of transmission 14. Motor assembly 46 of transmission 14 is connected to a battery 190 and can be selectively shifted into any of a DRIVE state, a CHARGING state, and a NO-LOAD state by powertrain control system 34. In the DRIVE state, transmission 14 functions as a motor-driven gearbox that is driven by electrical energy drawn from battery 190. In the CHARGING state, transmission 14 functions as an electric generator for storing electric energy in battery 190. In the NO-LOAD state, electric motor 46 is off and rotor shaft 102 is permitted to rotate freely relative to stator 192.

Figure 7:
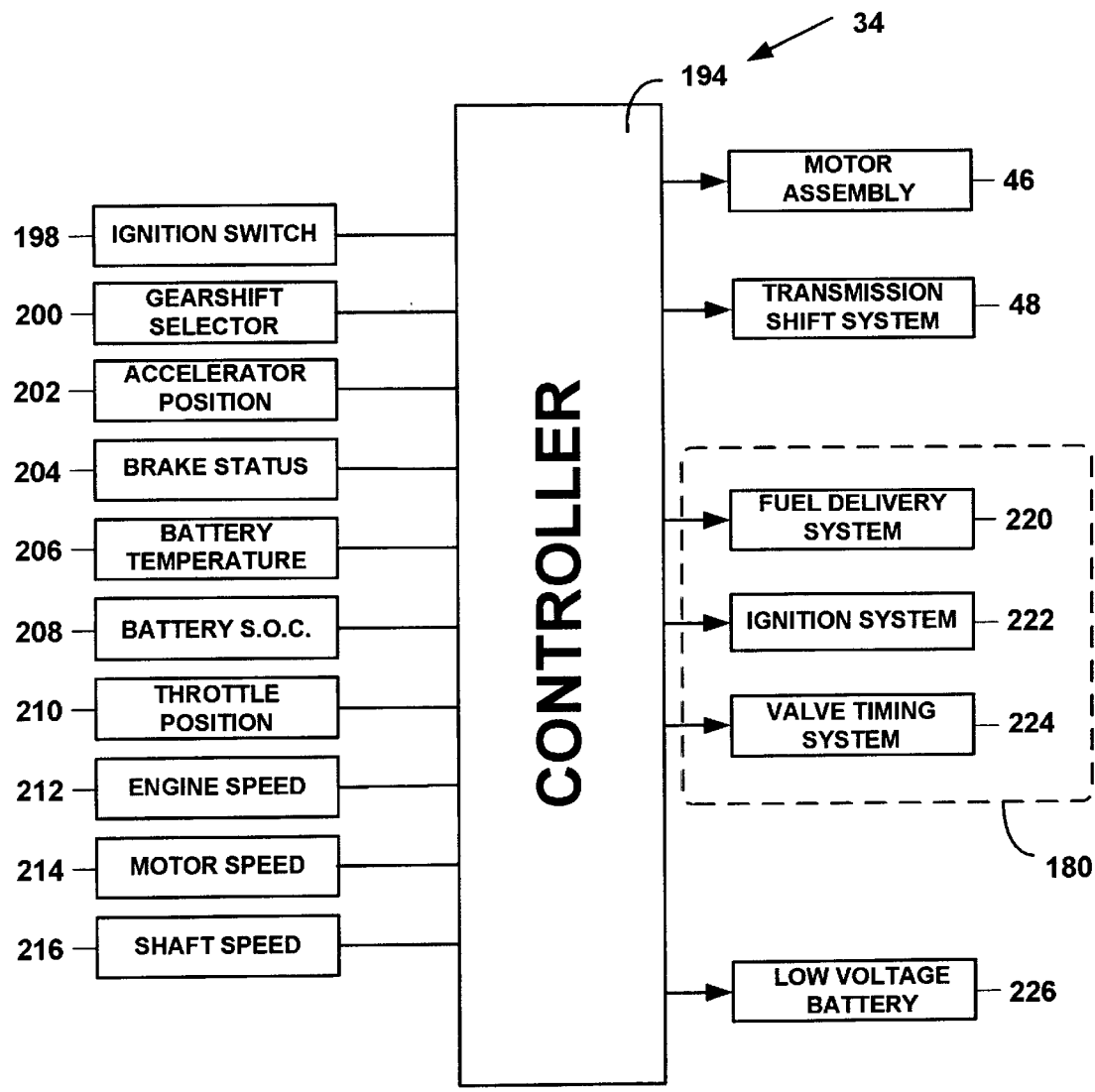
FIG. 7 is a diagramatical illustration of a hybrid powertrain control system adapted for use with the present invention.

Control system 34 is provided for controlling operation of the hybrid powertrain shown in FIG. 1. Referring to FIG. 7, control system 34 includes a controller 194 adapted to receive input signals from various sensors and input devices cumulatively identified in FIG. 1 as vehicle sensors 196. Controller 194 is principally comprised of a microcomputer having a central processing unit (CPU), random-access memory (RAM), read-only memory (ROM), and an input-output actuator interface. Controller 194 performs data processing operations to execute various control routines according to control programs and/or maps stored in the ROM. Controller 194 receives data from ignition switch 198, a gearshift lever switch 200, an accelerator position sensor 202, a brake status switch 204, a battery temperature sensor 206, a battery SOC (state of charge) sensor 208, and a throttle position sensor 210. In addition, other inputs include an engine speed sensor 212, a motor speed sensor 214, and a shaft speed sensor 216. Ignition switch 198 is closed when the vehicle key is turned on. Corresponding switches in gearshift selector switch 200 are closed when the gearshift mechanism is located in its Park (P), Neutral (N), Reverse (R) and Drive (D) positions, respectively. Accelerator position sensor 202 senses the depression angle of an accelerator pedal. Brake status switch 204 is turned on when the brake pedal is depressed. Battery temperature 206 senses the temperature of battery 190. Battery SOC sensor 208 senses the charge level of battery 190. Throttle position sensor 210 senses the degree of opening of the engine throttle valve. Engine speed sensor 212 senses a parameter indicative of the rotary speed of rotor 102 of motor assembly 46. Shaft speed sensor 216 senses the rotary speed of output shaft 42 or propshaft 16 and can further be used as an indication of vehicle speed.

Based on the operating information inputted to controller 194, a mode of operation of the hybrid powertrain is selected and controller 194 sends electric control signals to various power-operated control devices. Specifically, controller 194 monitors and continuously controls actuation of electric motor 46 of transmission 14, sends control signals to transmission controller 174 to control gear shifting, and controls various engine management systems 180 for controlling the speed and torque generated by engine 12. These engine management systems include a fuel delivery system 220, an ignition system 222, and a valve timing system 224. A low voltage battery 226 may serve as the power supply for controller 194.

There are four modes of operation for vehicle 10, namely: (a) an electric mode; (b) a hybrid mode; (c) an engine mode; and (d) a regenerative mode. In the electric mode, engine 12 is off and only electric motor 46 provides motive power to vehicle 10. In the hybrid mode, both engine 12 and electric motor 46 provide motive power to vehicle 10. In the engine mode, only engine 12 provides motive power to vehicle 10. In the regenerative mode, a portion of the engine power is absorbed by motor assembly 46 to charge battery 190. The transition from one mode to the next is smooth and transparent to the vehicle operator since controller 190 selects the most appropriate mode depending on various vehicle operating conditions including vehicle speed, accelerator demand and battery charge status.

When operating in the electric mode, engine 12 is stopped and input brake 38 is locked to brake rotation of first planet carrier 66 such that electric motor power drives geartrain 44 to establish a speed ratio drive connection with output shaft 42. Thereafter, sixth clutch 124 is locked to couple drive gear 100 to first transfer shaft 72, seventh clutch 126 is locked to couple second speed gear 110 to stationary member 128, and eight clutch 130 is locked to couple second transfer shaft 82 to stationary member 132. As such, driven rotation of rotor 102 functions to transfer drive torque through geartrain 44 to output shaft 42. Since first planet carrier 66 is held against rotation, motor 46 must be driven in the reverse direction to establish the forward drive. The reverse mode is simply established by reversing the rotary direction of motor 46. It is contemplated that the vehicle can be driven up to about 30 miles per hour in the electric mode to effectively reduce overall fuel consumption during urban driving conditions. While in the electric mode, motor 46 may be used to start engine 12 by releasing input brake 38.

When the powertrain control system determines that the vehicle should operate in the hybrid mode, engine 12 is started and motor 46 is slowed to reverse its direction. Thereafter, third clutch 118 is engaged. To operate in the engine only mode, motor 46 is only used to shift transmission 14. Since no conventional master clutch (or torque converter) is required between flywheel unit 36 and transmission 14, motor 46 may be located in the bellhousing immediately behind the flywheel. This position permits the motor torque to be multiplied by the transmission ratio and the large diameter motor can produce high torque at low electric power levels.

Figure 8:
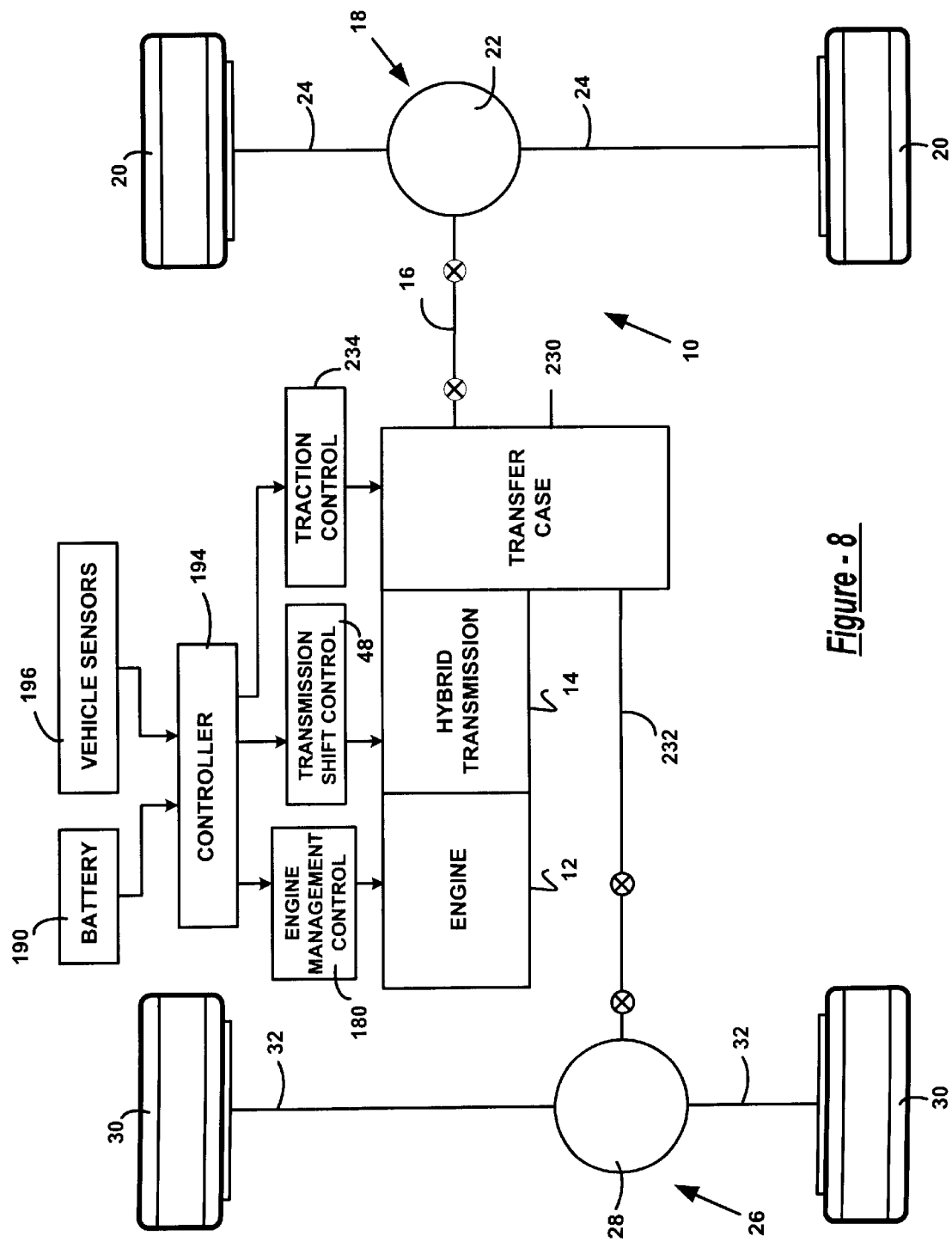
FIG. 8 is a schematic layout of a four-wheel drive hybrid motor vehicle equipped with transmission of the present invention.

Referring now to FIG. 8, the hybrid powertrain of the present invention is shown in vehicle 10 to now be installed in a four-wheel drive arrangement with output shaft 42 of transmission 14 delivering drive torque to the input shaft of a transfer case 230. Transfer case 230 has a first output shaft coupled to rear propshaft 16 and second output shaft coupled to a front propshaft 232. A traction clutch is provided in transfer case 230 to selective and/or automatically distribute drive torque from transmission output shaft 42 to one or both of propshafts 16 and 232. If traction clutch is electrically-actuated, a traction control system 234 would be used to control actuation.

What is claimed is:

1. A transmission for a motor vehicle having an engine and a driveline, comprising:

an input shaft adapted to be driven by the engine;

a mainshaft;

an output shaft adapted to drive the driveline;

first and second transfer shafts;

a first planetary gearset including a first sun gear fixed to said first transfer shaft, a first ring gear, and a set of first planet gears supported from a first carrier fixed to said input shaft;

a second planetary gearset including a second sun gear fixed to said second transfer shaft, a second ring gear fixed to said first ring gear, and a set of second planet gears supported from a second carrier that is fixed to said mainshaft;

a third planetary gearset including a third sun gear fixed to said mainshaft, a third ring gear, and a set of third planet gears supported from a third carrier that is fixed to said output shaft;

a layshaft assembly including a layshaft, a first constant-mesh gearset operably disposed between said layshaft and said second transfer shaft, and a second constant-mesh gearset operably disposed between said layshaft and said third ring gear; and an electric motor driving said layshaft.

2. The transmission of claim 1 further comprising:

a first clutch normally operable in a released mode and which can be shifted into a locked mode for coupling said third carrier to said third sun gear for locking said third planetary gearset such that said mainshaft drives said output shaft at a common speed;

a second clutch normally operable in a release mode and which can be shifted into a locked mode for coupling said second transfer shaft to said second carrier for locking said second planetary gearset such that said second ring gear drives said mainshaft at a common speed;

a third clutch normally operable in a released mode and which can be shifted into a locked mode for coupling said first transfer shaft to said first carrier for locking said first planetary gearset such that said first ring gear is driven at a common speed with said input shaft; and a mode shift system for controlling shifting of said first, second and third clutches between their respective released and locked modes.

3. The transmission of claim 2 further comprising:

a fourth clutch normally operable in a released mode and which can be shifted into a locked mode for engaging said second constant-mesh gearset such that layshaft drives said third ring gear;

a fifth clutch normally operable in a released mode and which can be shifted into a locked mode for engaging said first constant-mesh gearset such that said layshaft drives said second transfer shaft; and a sixth clutch normally operable in a released mode and which can be shifted into a locked mode for coupling said electric motor to said first transfer shaft;

wherein said mode shift system further controls shifting of said fourth, fifth, and sixth clutches between their respective released and locked modes.

4. The transmission of claim 3 further comprising:

a seventh clutch normally operable in a released mode and which can be shifted into a locked mode for coupling said second constant-mesh gearset to a stationary member to brake rotation of said third ring gear;

an eighth clutch normally operable in a released mode and which can be shifted into a locked mode for coupling said second transfer shaft to said stationary member to brake rotation of said second sun gear; and a ninth clutch normally operable in a released mode and which can be shifted into a locked mode for coupling said first transfer shaft to said stationary member to brake rotation of said first sun gear;

wherein said mode shift system is further operable to control shifting of said seventh, eight and ninth clutches between their respective released and locked modes.

5. The transmission of claim 4 wherein at lease one of said first through ninth clutches is a bi-directional controllable overrunning clutch operable in its released mode to permit bi-directional free-wheeling and in its locked mode to cause bi-directional locking.

6. The transmission of claim 4 wherein said mode shift system includes:

a first power-operated actuator for shifting said first clutch between its released and locked modes;

a second power-operated actuator for shifting said third clutch between its released and locked modes;

a fourth power-operated actuator for shifting said fourth clutch between its released and locked modes;

a fifth power-operated actuator for shifting said fifth clutch between its released and locked modes;

a sixth power-operated actuator for shifting said sixth clutch between its released and locked modes;

a seventh power-operated actuator for shifting said seventh clutch between its released and locked modes;

an eighth power-operated actuator for shifting said eighth clutch between its released and locked modes;

a ninth power-operated actuator for shifting said ninth clutch between its released and locked modes; and a transmission controller operable to control coordinated actuation of said first through ninth power-operated actuators.

7. The transmission of claim 6 further comprising:

an input brake normally operated in a released mode to permit rotation of said input shaft and further operable in a locked mode to brake rotation of said input shaft; and a power-operated brake actuator for shifting said input brake between its released and locked modes under the control of said transmission controller.

8. The transmission of claim 4 wherein a first speed ratio drive connection is established between said input shaft and said output shaft when said third, seventh, and eighth clutches are shifted into their locked modes.

9. The transmission of claim 8 wherein a second speed ratio drive connection is established by shifting said third clutch into its released mode while maintaining said seven and eight clutches in their locked modes and shifting said sixth clutch into its locked mode, thereafter said electric motor is actuated to react against drive torque transmitted from the engine to said input shaft for retarding rotation of said input shaft relative to said output shaft, upon synchronization said ninth clutch is shifted into its locked mode.

10. The transmission of claim 9 which is shifted from its second speed ratio drive connection into a third speed ratio drive connection by shifting said seventh and ninth clutches into their released modes while maintaining eighth clutch in its locked mode, shifting said third and fourth clutches into their locked modes, and thereafter shift said first clutch into its locked mode once actuation of said electric motor has resulted in speed synchronization between said third sun gear and said third carrier.

11. The transmission of claim 10 wherein during each upshift speed change, the torque produced by said electric motor reacts against the torque produced by the engine to establish a synchronous speed at which point the gear change is completed so as to permit powershifting between sequential speed ratios while torque is transmitted to said output shaft.

12. The transmission of claim 4 further comprising an input brake operable in a locked mode to prevent rotation of said input shaft, and wherein an electric drive mode is established with the engine stopped and said input brake in its locked mode such that drive torque generated by said electric motor is transferred to the driveline, and wherein said sixth, seventh, and eighth clutches are locked.

13. The transmission of claim 1 wherein said electric motor is electrically connected to a battery and can be selectively shifted between a drive state, a charging state, and a no-load state, said electric motor is operable in its drive state to draw electric energy from said battery and transmit motive power to the driveline through said transmission, said electric motor is operable in its charging state to function as a generator for storing electric energy in said battery, and said electric motor is turned off in its no-load state.

14. A hybrid transmission for use in a motor vehicle having an engine and a driveline, comprising:

an input shaft adapted to be driven by the engine;

a mainshaft;

an output shaft adapted to drive the driveline;

a geartrain including a first planetary gearset having a first input member driven by said input shaft, a first output member and a first reaction member, a second planetary gearset having a second input member driven by said first output member, a second output member driving said mainshaft, and a second reaction member, and a third planetary gearset having a third input member driven by said mainshaft, a third output member driving said output shaft, and a third reaction member;

an electric motor having an output rotor;

a first clutch for selectively coupling said output rotor to said first reaction member;

a second clutch for selectively coupling said first reaction member to a stationary member;

a third clutch for selectively coupling said first input member to said first reaction member;

a fourth clutch for selectively coupling said second reaction member to said stationary member;

a fifth clutch for selectively coupling said second reaction member to said second output member; and a sixth clutch for selectively coupling said third input member to said third output member.

15. The transmission of claim 14 further comprising:

a layshaft driven by said output rotor of said electric motor;

a first constant-mesh gearset disposed between said layshaft and said second reaction member;

a seventh clutch for selectively engaging said first constant-mesh gearset;

a second constant-mesh gearset disposed between said layshaft and said third reaction member;

an eighth clutch for selectively engaging said second constant-mesh gearset; and a ninth clutch for selectively coupling said third reaction member to said stationary member.

16. The transmission of claim 15 further comprising an input brake for selectively braking rotation of said input shaft and said first input member.

17. The transmission of claim 15 wherein said first input member is a first carrier fixed to said input shaft and supporting a set of first planet gears, said first output member is a first ring gear, and said first reaction member is a first sun gear.

18. The transmission of claim 17 wherein said second input member is a second ring gear fixed to said first ring gear, said second output member is a second carrier fixed to said mainshaft and which supports a set of second planet gears, and said second reaction member is a second sun gear.

19. The transmission of claim 18 wherein said third input member is a third sun gear fixed to said mainshaft, said third output member is a third carrier fixed to said output shaft and which supports a set of third planet gears, and said third reaction member is a third ring gear.

20. The transmission of claim 19 wherein said output rotor of said electric motor is coupled to said first sun gear when said first clutch is locked, and wherein said output rotor drives or is driven by said layshaft.

21. The transmission of claim 14 wherein an electric drive mode is established when all drive torque delivered to said output shaft is generated by said electric motor, an engine mode is established when all drive torque delivered to said output shaft is generated by the engine, and a hybrid mode is established when the drive torque delivered to said output shaft is generated in combination by the engine and said electric motor.

* * * * *